US006579331B1

(12) United States Patent
Ho (10) Patent No.: US 6,579,331 B1
(45) Date of Patent: Jun. 17, 2003

(54) $CO_2$-SELECTIVE MEMBRANE PROCESS AND SYSTEM FOR REFORMING A FUEL TO HYDROGEN FOR A FUEL CELL

(75) Inventor: Win-Sow Winston Ho, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/432,547

(22) Filed: Nov. 3, 1999

Related U.S. Application Data (63) Continuation of application No. 08/904,718, filed on Aug. 1, 1997, now abandoned.

(51) Int. Cl.[7] ................................................. C01B 3/24
(52) U.S. Cl. .................... 48/198.3; 48/198.2; 48/198.7; 48/DIG. 5; 422/189; 422/192; 422/211; 422/236; 422/240; 95/51; 96/14
(58) Field of Search ........................... 48/197 R, 198.2, 48/198.3, 198.7, DIG. 5; 422/187, 188, 189, 192, 211, 236, 240; 95/45, 51; 96/14

(56) References Cited

U.S. PATENT DOCUMENTS 3,765,946 A    10/1973  Werner et al.
4,117,079 A    9/1978   Bellows
4,238,468 A    12/1980  Bonacci et al.
4,921,765 A    5/1990   Gmeindl et al.
5,611,843 A    3/1997   Ho

FOREIGN PATENT DOCUMENTS

DE     19600954 A1    7/1996
EP     0311903 A2     4/1989
EP     0729196 A1     8/1996

*Primary Examiner*—Jerry D. Johnson
*Assistant Examiner*—Basia Ridley
(74) *Attorney, Agent, or Firm*—Ronald D. Hantman (57) ABSTRACT

The present invention provides a $CO_2$-selective membrane process that is useful for the purification and/or water gas shift reaction of a reformed gas, generated from on-board reforming of a fuel, e.g., hydrocarbon, gasoline, diesel, methanol or natural gas, to hydrogen for fuel cell vehicles. Another embodiment of the present invention is directed toward a composition comprising a hydrophylic polymer and at least one ammonium halide salt, the ammonium halide salt being present in an amount ranging from about 10 to 80 wt % based on the total weight of the composition. The composition is suitable in formation of a membrane useful for separating $CO_2$ from a $CO_2$-containing gas, particularly from an on-board reformed gas for the $CO_2$-selective membrane process.

17 Claims, 4 Drawing Sheets

FLOW DIAGRAM FOR THE FIRST CASE OF THE $CO_2$-SELECTIVE MEMBRANE PROCESS
OF THE PRESENT INVENTION

Figure 1

FLOW DIAGRAM FOR THE FIRST CASE OF THE CO₂-SELECTIVE MEMBRANE PROCESS OF THE PRESENT INVENTION

Figure 2

FLOW DIAGRAM FOR THE SECOND CASE OF THE $CO_2$-SELECTIVE MEMBRANE PROCESS OF THE PRESENT INVENTION

Figure 3

FLOW DIAGRAM FOR THE THIRD CASE OF THE $CO_2$-SELECTIVE MEMBRANE PROCESS OF THE PRESENT INVENTION

Figure 4

FLOW DIAGRAM FOR THE FOURTH CASE OF THE $CO_2$-SELECTIVE MEMBRANE PROCESS OF THE PRESENT INVENTION

CO₂-SELECTIVE MEMBRANE PROCESS AND SYSTEM FOR REFORMING A FUEL TO HYDROGEN FOR A FUEL CELL

This application is a continuation under 37 CFR 1.53(b) of U.S. Ser. No. 08/904,718, filed Aug. 1, 1997 now abandoned.

FIELD OF THE INVENTION

The present invention relates to a membrane process and system for the purification of a fuel, e.g., hydrocarbon, gasoline, diesel, methanol, ethanol or natural gas, to hydrogen for fuel cells. The purification process selectively reomves $CO_2$ from the reformed product thereby enriching the reformed product in $H_2$ and increasing the $H_2/CO_2$ ratio. This invention also relates to a polymer composition suitable for forming a membrane that is useful for separating $CO_2$ from a $CO_2$-containing gas stream in the purification process. The present invention is particularly useful when the process is carried-out on-board a vehicle using a fuel cell for transportation.

BACKGROUND OF THE INVENTION

Reforming of a fuel, e.g., hydrocarbon, gasoline, diesel, methanol, ethanol or natural gas, to hydrogen is generally proceeded with the formation of the synthesis gas of CO and $H_2$ first. For example, steam reforming of methanol with a $NiO/Al_2O_3$ catalyst at 300–400° C. (T. B. Su and M. H. Rei, *J. Chin. Chem. Soc.* (Taipei), 38, 535 (1991)) gives the synthesis gas:

$$CH_3OH \rightarrow CO + 2H_2 \qquad (1)$$

Steam reforming of $CH_4$ with a nickel-based catalyst at 800° C. is:

$$CH_4 + H_2O \rightarrow CO + 3H_2 \qquad (2)$$

Partial oxidation of $CH_4$ is:

$$CH_4 + \tfrac{1}{2}O_2 \rightarrow CO + 2H_2 \qquad (3)$$

Similarly, partial oxidation of other hydrocarbons, e.g., gasoline and diesel, produces the synthesis gas:

$$C_nH_{2n+2} + \tfrac{n}{2}O_2 \rightarrow n\,CO + (n+1)H_2 \qquad (4)$$

where n is an integer. In the partial oxidation, the synthesis gas produced does not contain $N_2$ when $O_2$ is used. If air is used instead of $O_2$, the synthesis gas produced contains $N_2$.

The synthesis gas is then sent conventionally to two-stage water gas shifters, in which CO is converted to $CO_2$ via the water gas shift reaction:

$$CO + H_2O \rightarrow CO_2 + H_2 \qquad (5)$$

Typically, the first-stage shifter operates at higher temperature than the second-stage shift, e.g., 373° C. for the first stage and 225° C. for the second stage. For the water gas shift reaction, $CuO/ZnO/Al_2O_3$ catalysts can be used. The product gas from steam reforming of methanol under the optimum conditions at 1 atm and 227° C. with a water rich feed (water/methanol =1.5) contains approximately 66% $H_2$, 21% $CO_2$, 1% CO, and 12%,$H_2O$ (J. C. Amphlett, M. J. Evans, R. A. Jones, R. F. Mann, and R. D. Weir, *Can. J. Chem. Eng.*, 59, 720 (1981)).

In some reforming cases, such as the steam reforming of methanol with a $CuO/ZnO/Al_2O_3$ catalyst, methanol is converted directly and predominantly to $CO_2$ and $H_2$:

$$CH_3OH + H_2O \xrightarrow{\text{catalyst}} CO_2 + 3H_2 \qquad (6)$$

This reaction operates at temperatures lower than 260° C. with methanol conversion as high as 90%; however, trace CO appears at temperatures above 300° C. and high methanol conversions of about 90% (C. J. Jiang, D. L. Trimm, and M. S. Wainwright, *Appl. Catal. A*, 93, 245 (1993)).

Japanese Patents 04,321,502 and 04,325,402 claim processes employing $H_2$-selective membranes, which selectively pass $H_2$ and reject other gases, for hydrogen manufacture for fuel cells. However, these processes suffer from a low pressure for the $H_2$ product gas which is much lower than the pressure for the feed gas. Thus, a compressor is needed to compress the product gas to the pressure of the feed gas. In addition, these processes also usually have other shortcomings, such as low $H_2$ recovery, large membrane areas, and a high $CO_2$ concentration in the product gas.

It is an object of the present invention to provide a $CO_2$-selective membrane process that selectively passes $CO_2$ over $H_2$ and other gases and that is useful for the purification and/or water gas shift reaction of a reformed gas, generated from reforming of a fuel, e.g., hydrocarbon, gasoline, diesel, methanol, ethanol or natural gas, to hydrogen for fuel cells. This $CO_2$-selective membrane process can be more advantageous than $H_2$-selective membrane processes in terms of $H_2$ product pressure (to avoid the need of a compressor for the product gas), $H_2$ recovery, membrane area, and $CO_2$ concentration. Another object of the present invention is to provide a novel polymer composition that is suitable in formation of a membrane useful for the $CO_2$-selective membrane process. Membranes disclosed in U.S. Pat. No. 5,611,843 may also be used for the $CO_2$ selective membrane process.

SUMMARY OF THE INVENTION

The present invention is a process and system to purify a fuel feedstream so that the feedstream is enriched in $H_2$. In general, the process includes the steps of reforming the feedstream, and separating $CO_2$ with a membrane that selectively removes $CO_2$ from the feedstream. For most fuel feedstreams, a step of water gas shift reaction is also included in the process. The $CO_2$ selectively permeable membrane may also be used to perform both steps of enhancing water gas shift reaction and separating $CO_2$. The process further comprises the step of methanating the $H_2$-enriched feedstream.

If the fuel feedstream is methanol, then a water gas shift reaction step is not necessary. In this embodiment, the $CO_2$ selectively permeable membrane may be used to perform both steps of reforming and separating.

In a preferred embodiment, the process is carried-out on board a vehicle that uses a fuel cell for transportation.

Another embodiment of the present invention is directed toward a composition comprising a hydrophilic polymer and at least one ammonium halide salt, the ammonium halide salt being present in an amount ranging from about 10 to about 80 wt % based on the total weight of the composition. The composition is suitable in formation of a membrane useful for separating $CO_2$ from a $CO_2$-containing gas, particularly from an on-board reformed gas for the $CO_2$-selective membrane process.

The embodiments of the present invention will become apparent upon a reading of the brief description of the drawings and the detailed description of the invention which follow.

DETAILED DESCRIPTION OF THE INVENTION

The present invention provides a $CO_2$-selective membrane process that is useful for the purification of a fuel, e.g., hydrocarbon, gasoline, diesel, methanol, ethanol or natural gas, to hydrogen for fuel cells. This process includes reforming the fuel feedstream and separating $CO_2$ from the feedstream. The $CO_2$ is removed by contacting a $CO_2$-containing gas stream with one side of a nonporous, $CO_2$ selectively permeable membrane whereby $CO_2$ is selectively transported over other gases through the membrane and withdrawing from the other side of the membrane a permeate containing $CO_2$ whereby $CO_2$ is selectively removed from the gaseous stream. The permeate comprises the $CO_2$ in increased concentration relative to the feed stream. By "permeate" is meant that portion of the feed stream which is withdrawn at the second side of the membrane, exclusive of other fluids such as sweep gas or liquid which may be present at the second side of the membrane. Air or nitrogen may be used as the sweep gas.

There are four embodiments of the process and the system for performing the process.

Figure 1:
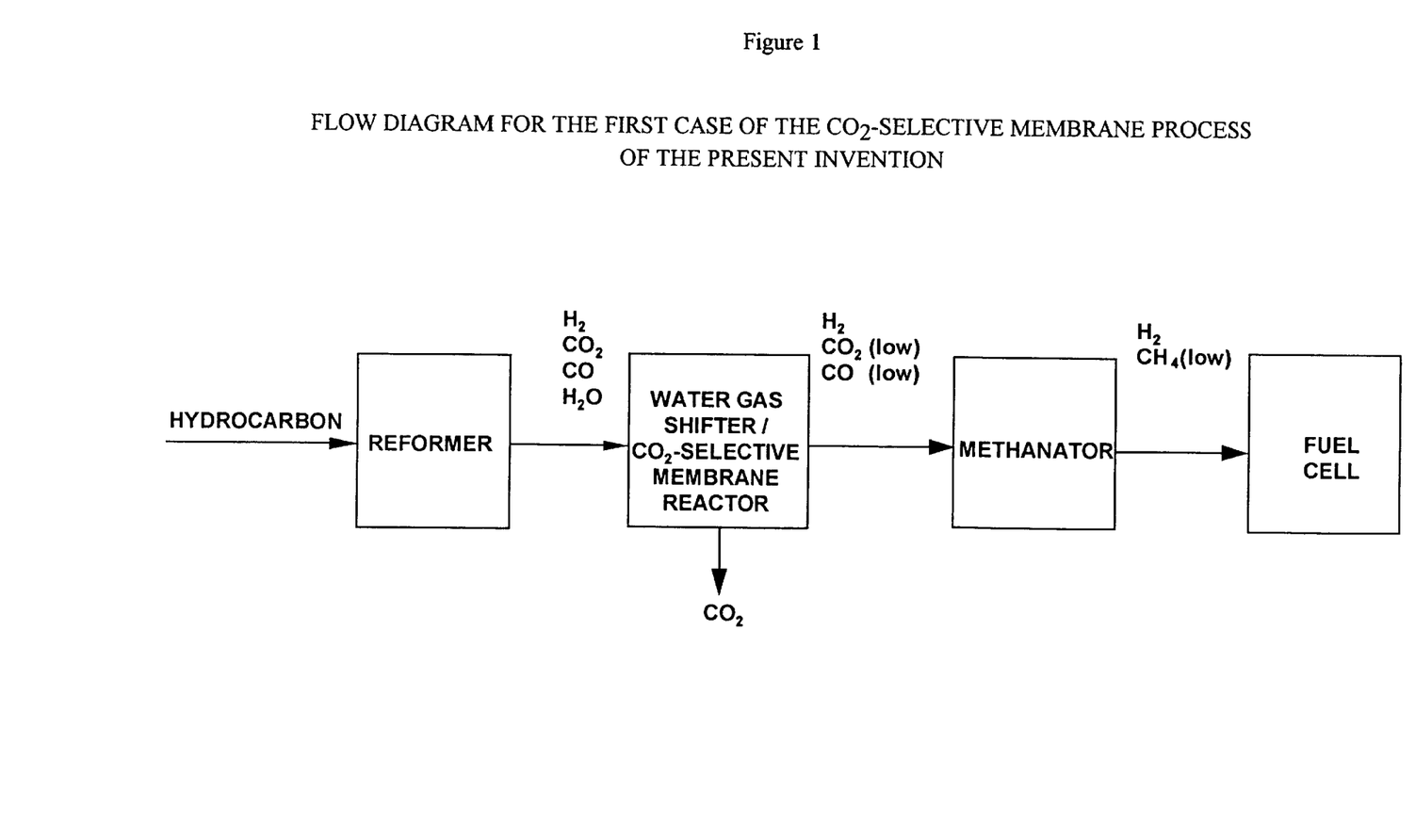
FIG. 1 shows the flow diagram for the first case of the $CO_2$-selective membrane process of the present invention, in which a $CO_2$-selective membrane is incorporated into the water gas shifter to become the water gas shifter and $CO_2$-selective membrane reactor for enhancing the conversion of the water gas shift reaction and for purifying the $H_2$ product via $CO_2$ removal.

In the first case of the present invention, a $CO_2$-selective membrane is incorporated into the water gas shifter to become the water gas shifter and $CO_2$-selective membrane reactor for enhancing the conversion of the water gas shift reaction (Eq.(5)) and for purifying the $H_2$ product via $CO_2$ removal. FIG. 1 shows the flow diagram for the $CO_2$-selective membrane process of the present invention, consisting of a reformer, a water gas shifter and $CO_2$-selective membrane reactor, a methanator, and a fuel cell. As shown in this figure, the $H_2$ product with low $CO_2$ and CO concentrations is sent to the methanator, in which $CO_2$ and CO are converted to $CH_4$ via the methanator reactions:

$$CO_2 + 4H_2 \rightarrow CH_4 + 2H_2O \quad (7)$$

$$CO + 3H_2 \rightarrow CH_4 + H_2O \quad (8)$$

For enhancing the methanation reactions (Eqs. (7) and (8)), a catalyst of Ru supported on $TiO_2$ may be used. Finally, the high-purity $H_2$ product with $CH_4$ is fed to the fuel cell to drive the electric vehicle. The $H_2$ product without CO and $CO_2$ is the most desirable fuel for the fuel cell since CO is a poison for the fuel cell and $CO_2$ produces CO via the reverse reaction of Eq.(5). To speed up the removal of $CO_2$ from the permeate side of the $CO_2$-selective membrane process, a sweep gas, such as air, may be used. The exit stream of the sweep gas may be combined with the anode exhaust stream of the fuel cell to be burned for supplying heat, for example, to the steam reformer or for other heat integration.

Figure 2:
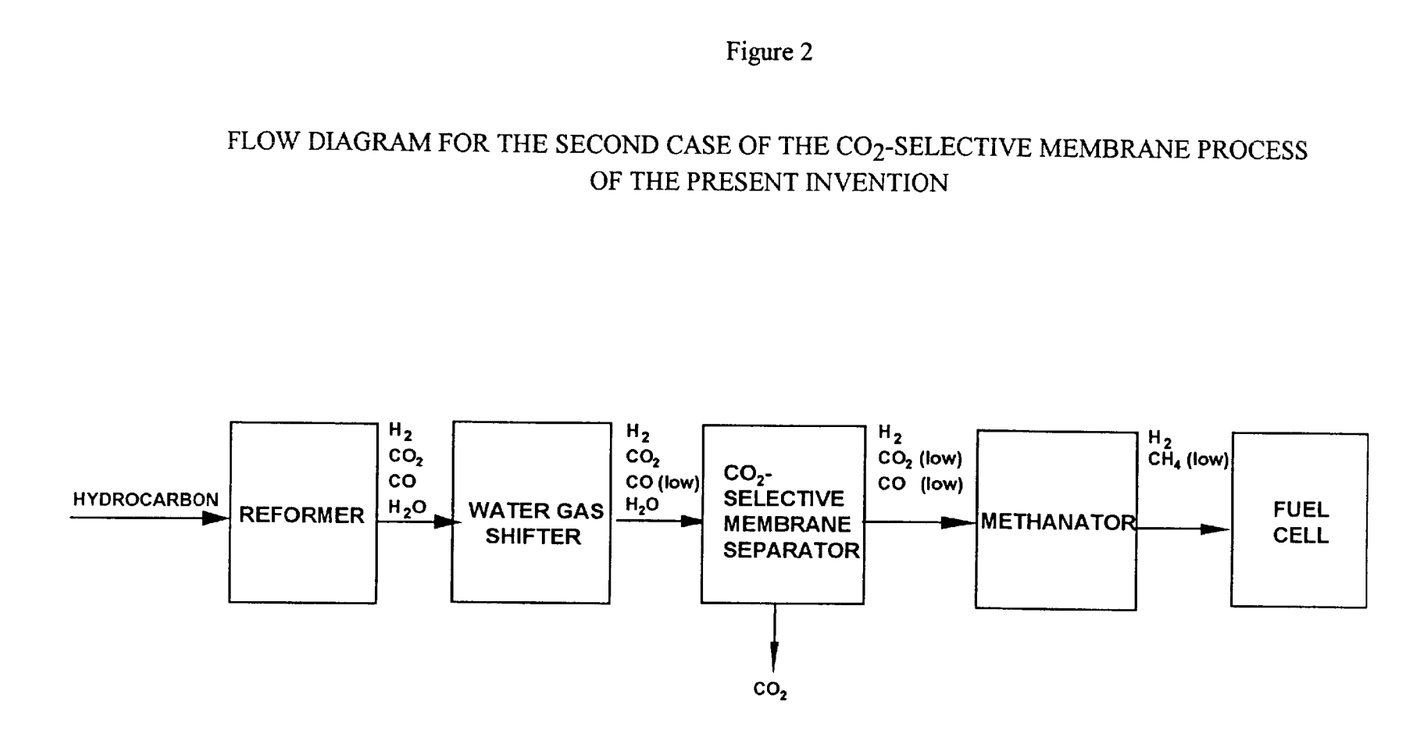
FIG. 2 illustrates the flow diagram for the second case of the $CO_2$-selective membrane process of the present invention, in which a $CO_2$-selective membrane separator is used to purify the $H_2$ product from the water gas shift converter.

The second case of the present invention involves the use of a $CO_2$-selective membrane separator to purify the $H_2$ product from the water gas shifter converter. FIG. 2 gives the flow diagram for the $CO_2$-selective membrane process, consisting of a reformer, a water gas shifter, a $CO_2$-selective membrane separator, a methanator, and a fuel cell.

Figure 3:
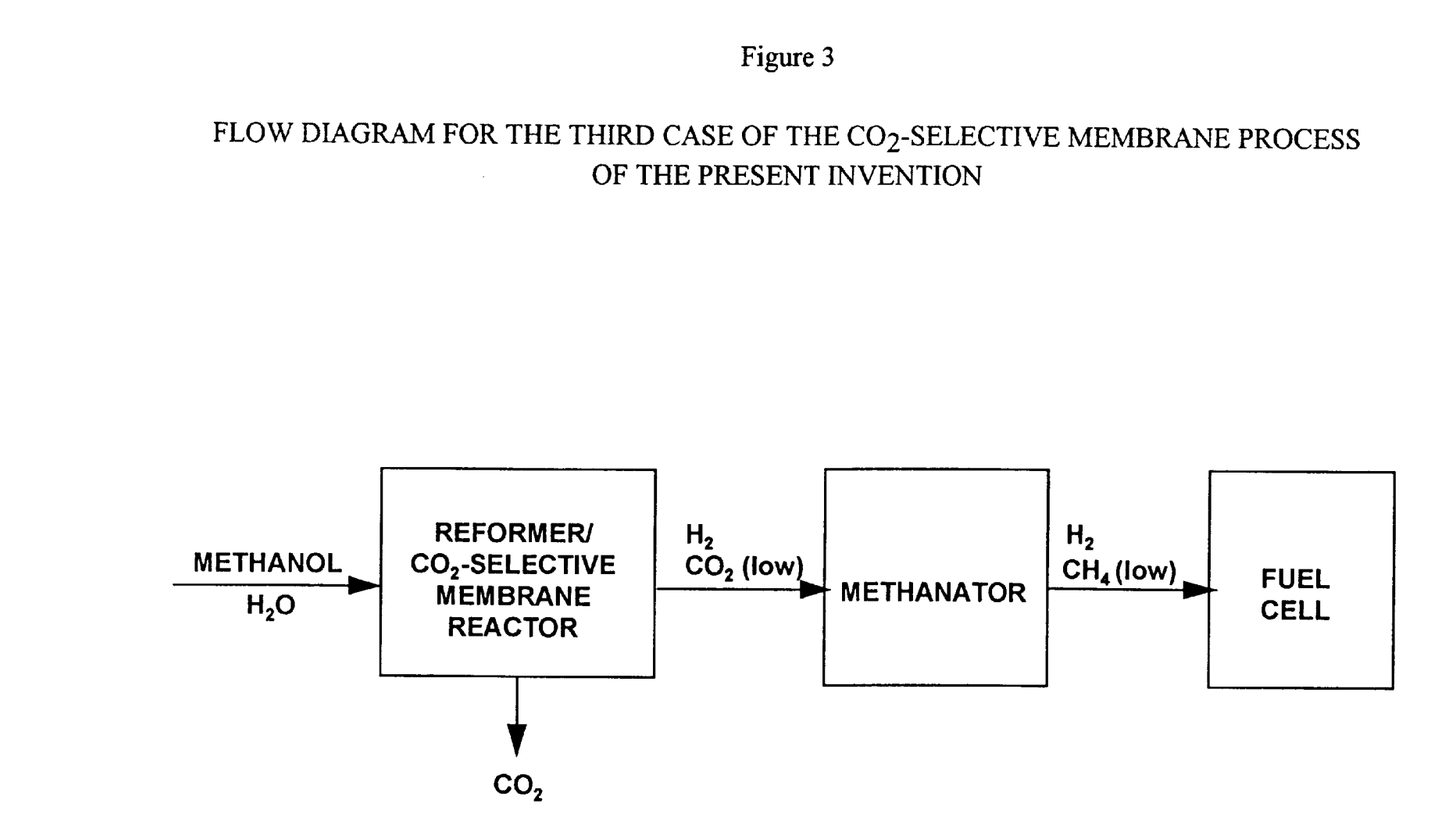
FIG. 3 exhibits the flow diagram for the third case of the $CO_2$-selective membrane process of the present invention, in which a $CO_2$-selective membrane is incorporated into the steam reformer for methanol to become the reformer and $CO_2$-selective membrane reactor for increasing the conversion of the methanol steam reforming reaction and for purifying the $H_2$ product via $CO_2$ removal.

As mentioned earlier, in some reforming cases, such as the steam reforming of methanol with a $CuO/ZnO/Al_2O_3$ catalyst, methanol is converted directly and predominantly to $CO_2$ and $H_2$ The third case of the present invention is to incorporate a $CO_2$-selective membrane into the methanol steam reformer to become the reformer and $CO_2$-selective membrane reactor for increasing the conversion of the steam reforming reaction (Eq.(6)) and for purifying the $H_2$ product via $CO_2$ removal. FIG. 3 shows the flow diagram for the $CO_2$-selective membrane process of this invention, consisting of a reformer and $CO_2$-selective membrane reactor, a methanator, and a fuel cell.

Figure 4:
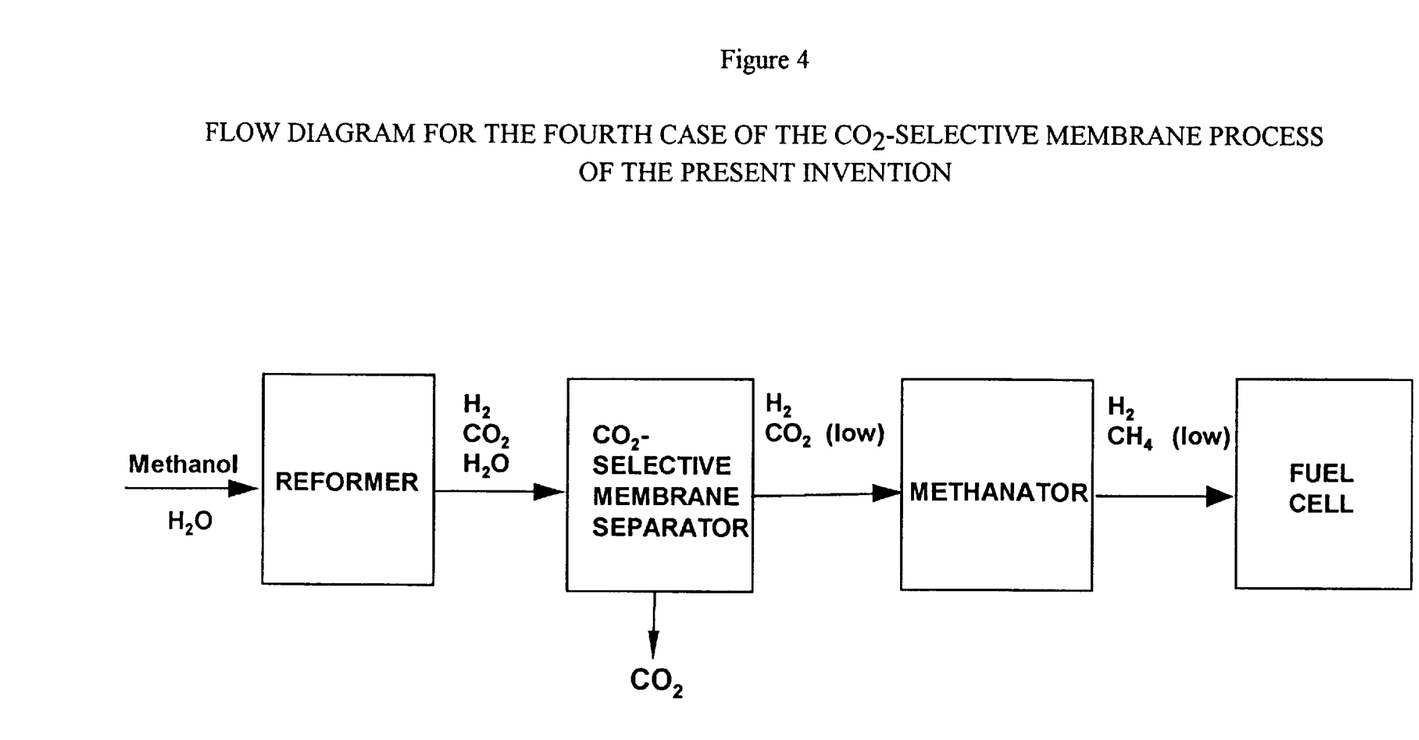
FIG. 4 shows the flow diagram for the fourth case of the $CO_2$-selective membrane process of the present invention, in which a $CO_2$-selective membrane separator is used to purify the $H_2$ product from the steam reforming of methanol.

The fourth case of the present invention uses a $CO_2$-selective membrane separator to purify the $H_2$ product from the steam reforming of methanol shown in Eq.(6). FIG. 4 illustrates the flow diagram for the $CO_2$-selective membrane process, consisting of a reformer, a $CO_2$-selective membrane separator, a methanator, and a fuel cell.

Another embodiment of the present invention is directed toward a composition comprising a hydrophilic polymer and at least an ammonium halide salt, the ammonium halide salt being present in an amount ranging from about 10 to about 80 wt % based on the total weight of the composition and preferably about 40 to about 65 wt %.

The hydrophilic polymers suitable in the practice of the present invention include polyvinylalcohol, polyvinylpyrrolidone, polyethyleneoxide, polypropyleneoxide, polyacrylamide, polyvinylacetate, blends and copolymers thereof. In general, these polymers will have weight average molecular weights in the range of about 30,000 to 2,000,000 and preferably in the range from about 50,000 to 200,000. Particularly preferred polymers useful in the present invention are polyvinylalcohols having molecular weights in the range from about 50,000 to 150,000.

The ammonium halide salts in the compositions of the present invention are selected from salts having the formulae and mixtures thereof:

$$(R)_4 N^+ X^-$$

wherein R is hydrogen or an alkyl group having from 1 to 4 carbon atoms and X is a halide, the halide being selected from the group consisting of fluoride, chloride, bromide, iodide, and mixtures thereof.

As previously stated, the amount of ammonium halide salt to be present in the composition is in the range from about 10 to 80 wt % based on the total weight of the composition, and preferably about 40 to about 65 wt %.

The compositions of the present invention are prepared by first forming a solution of the polymer and the ammonium halide salt in a suitable solvent such as water. Generally, the amount of water employed will be in the range from about 70% to 95%. The composition can then be recovered from the solution by removing the solvent, for example, by allowing the solvent to evaporate; however, it is preferred to use the solution in forming a nonporous membrane. Thus, the resulting solution is formed into a nonporous membrane by techniques well known in the art. For example, the polymer solution can be cast onto a solid support with techniques such as "knife casting" or "dip casting". Knife casting, of course, is a process in which a knife is used to draw a polymer solution across a flat surface to form a thin film of the polymer solution of uniform thickness after which the solvent of the polymer solution is evaporated, at ambient or temperatures up to about 200° C., to yield the fabricated membrane. When, for example, a glass plate is used as the flat surface, the membrane can then be removed from the support providing a free standing polymer membrane. When, alternatively, the flat surface used is a non-selective porous support such as porous polytetrafluoroethylene, the resulting membrane is a composite membrane comprising the selective membrane polymer and the support. Dip casting is the process in which the polymer solution is contacted with a non-selective porous support. Then excess solution is permitted to drain from the support, and the solvent of the polymer solution is evaporated at ambient or elevated temperatures as above. The membrane comprises both the polymer and the porous support.

The membranes of the present invention also may be shaped in the form of hollow fibers, tubes, films, sheets and the like.

In an alternate embodiment of the present invention, a cross-linking agent is added to the polymer and ammonium halide salt solution before forming a membrane from it.

Suitable cross-linking agents include formaldehyde, divinyl sulfone, toluene diisocyanate, glyoxyal, glutaraldehyde, trimethylol melamine, terephthalatealdehyde, epichlorohydrin, vinyl acrylate, and maleic anhyride. Formaldehyde, divinyl sulfone and toluene dissocyanate are particularly preferred.

The amount of cross-linking agent employed will be in the range of about 1 to about 20 wt % based on the total weight of the solid composition formed from the solution.

Membranes formed from the solution containing a cross-linking agent typically are heated at a temperature and for a time sufficient for cross-linking to occur. Generally, cross-linking temperatures in the range from about 80° C. to about 200° C. are employed. Cross-linking will occur in from about 1 to 72 hours.

As indicated previously, the compositions of the present invention are suitable for use as a nonporous membrane for separating $CO_2$ from a $CO_2$-containing gas stream, particularly from an on-board reformed gas for the $CO_2$-selective membrane process of the present invention.

The present invention will be better understood by reference to the following examples which are offered by way of illustration not limitation.

EXAMPLES

In the examples which follow, the separation factor (selectivity) for $CO_2$ vs. $H_2$ is expressed as follows:

$$SeparationFactor = \frac{CO_2/H_2 \text{ concentration ratio in the permeate}}{CO_2/H_2 \text{ concentration ratio in the retentate}} \quad (9)$$

The retentate refers to the mixture on the feed side of the membrane which is rejected by the membrane under the operating conditions. Permeability is expressed in Barrer (1 Barrer=$10^{-10}$ cm$^3$(STP)·cm/(cm$^2$·s·cm Hg)). The permeability is determined by the use of the relationship between the permeability P and the permeation rate Q (cm$^3$(STP)/s) as follows:

$$Q = A P (p_1-p_2)/L \quad (10)$$

where A is the membrane area, $P_1$ and $P_2$ are the $CO_2$ partial pressures in the retentate and permeate streams, respectively, and L is the membrane thickness. P/L is called the permeance with a typical unit of GPU (gas permeation unit, 1 GPU=$10^{-6}$cm$^3$(STP)/(cm$^{2 \cdot s}$·cm Hg)). The partial pressures are determined based on concentration measurements by gas chromatography and total pressure measurements by pressure gauges. The permeation rate is determined based on concentration measurements obtained by gas chromatography and permeate stream flow rate measurements by a flow meter.

Example 1

$CO_2$-Selective Membrane Process for Purification of a Reformed Gas Containing $N_2$ at 3 atm The $CO_2$-selective membrane process of the present invention is used to purify a reformed gas to supply $H_2$ to a 10 KW fuel cell with a flow diagram shown in FIG. 2 or 4. It should be noted that a fuel cell vehicle may require several 10 KW fuel cells, e.g., 5 (50 KW total). The 10 KW fuel cell requires a hydrogen feed rate of 0.07 mole $H_2$/s. The reformed gas contains 40% $H_2$, 19% $CO_2$, 1% CO, and 40% $N_2$ (on a water-free basis) at a total pressure of 3 atm. The $CO_2$-selective membrane used has a $CO_2$ permeance of 600 GPU, a $CO_2/H_2$ selectivity of 75, a $CO_2$/CO selectivity of 100, and a $CO_2/N_2$ selectivity of 100. Air is used as the sweep gas for the permeate to have $H_2$, $CO_2$, CO and $N_2$ partial pressures in the permeate to be insignificant in comparison with their partial pressures in the retentate. By the use of Eq. (10), the membrane area, $H_2$, CO and $N_2$ concentrations in the retentate, and $H_2$ recovery are calculated for a $CO_2$ concentration of 0.5% in the retentate. The membrane area is 92.5 ft$^2$, the retentate, i.e., the product gas, has 49.0% $H_2$, 0.5% $CO_2$, 1.2% CO, and 49.3% $N_2$ at a total pressure of 3 atm, and the $H_2$ recovery is 97.2% of the $H_2$ available in the reformed gas. The retentate is then treated in a methanator to convert $CO_2$ and CO to $CH_4$, resulting in a desirable fuel without containing $CO_2$ and CO for the fuel cell.

Example 2

$CO_2$-Selective Membrane Process for Purification of a Reformed Gas Containing $N_2$ at 10 atm The $CO_2$-Selective Membrane Process of the present invention for purification of a reformed gas containing 40% $H_2$, 19% $CO_2$, 1% CO, and 40% $N_2$ (on a water-free basis) at a total pressure of 10 atm is the same as that described in Example 1 except the total pressure. The higher the total pressure (at the same gas composition), the smaller the membrane area. Again, Eq. (10) is used to calculate the membrane area, $H_2$, CO and $N_2$ concentrations in the retentate, and $H_2$ recovery for a $CO_2$ concentration of 0.5% in the retentate. The membrane area is 27 ft², the retentate (product gas) has 49.0% $H_2$, 0.5% $CO_2$, 1.2% CO, and 49.3% $N_2$ at a total pressure of 10 atm, and the $H_2$ recovery is 97.2% of the $H_2$ available in the reformed gas. Similarly, the retentate is then treated in a methanator to convert $CO_2$ and CO to $CH_4$, yielding a desirable fuel cell fuel without containing $CO_2$ and CO.

Example 3

$H_2$-Selective Membrane Process for Purification of a Reformed Gas Containing $N_2$ at 10 atm (for Comparison)

For comparison, the membrane area and $H_2$, $CO_2$, CO and $N_2$ concentrations in the permeate, i.e., the product gas, for an $H_2$-selective membrane process with 80% $H_2$ recovery from the same reformed gas described in Example 2 are calculated in the same way as in Example 2 via Eq. (10) for the 10 KW fuel cell. The membrane process uses a state-of-the-art, commercially available $H_2$-selective membrane (polyimide) with a $H_2$ permeance of 100 GPU, a $H_2/CO_2$ selectivity of 10, a $H_2/CO$ selectivity of 100, and a $H_2/N2$ selectivity of 170 (W. S. Winston Ho and Kamalesh K. Sirkar, *Membrane Handbook*, p. 44, Chapman & Hall, New York (1992)), and this process gives the product gas (permeate) at 1 atm (without the use of a sweep gas). The membrane area is 126 ft², and the product gas (permeate) contains 88.3% of $H_2$, 10.1% $CO_2$, 0.06% CO, and 1.5% $N_2$. Table 1 shows the comparison of the $CO_2$-selective membrane process of the present invention (Example 2) with the $H_2$-selective membrane process (Example 3). As shown in this table, the membrane process of this invention gives much higher product gas pressure (10 atm vs. 1 atm), greater $H_2$ recovery (97.2% vs. 80%), and less membrane area required (27 ft² vs. 126 ft²) than the $H_2$-selective membrane process. In addition, the former process gives a lower combined concentration of carbon oxides in the product gas (0.5% $CO_2$ and 1.2% CO vs. 10.1% $CO_2$ and 0.06% CO) than the latter process. The product gas of the former process is suitable for methanation to yield a desirable fuel cell fuel without carbon oxides, whereas the product gas of the latter process has too much $CO_2$ to be practically suitable for methanation. Therefore, the process of this invention is more effective and advantageous than the $H_2$-selective membrane process.

Example 4

$CO_2$-Selective Membrane Process for Purification of a Reformed Gas without Containing $N_2$ at 10 atm Similar to the process described in Example 1, the $CO_2$-selective membrane process of the present invention is employed to purify a reformed gas to supply $H_2$ to a 10 KW fuel cell with a flow diagram shown in FIG. 2 or 4. As mentioned earlier, a fuel cell vehicle may require several 10 KW fuel cell, e.g., 5 (50 KW total). The 10 KW fuel cell requires a hydrogen feed rate of 0.07 mole $H_2$/s. The reformed gas does not contain $N_2$, and it has a composition of 74.9% $H_2$, 24% $CO_2$, and 1.1% CO (on a water-free basis) at a total pressure of 10 atm. The $CO_2$-selective membrane used, which has a composition of 50 wt % tetramethylammonium fluoride salt and 50 wt % polyvinylalcohol described in Examples 6 and 7, has a $CO_2$ permeance of 600 GPU and a $CO_2/H_2$ selectivity of 19. Air is used as the sweep gas for the permeate to have $H_2$, $CO_2$ and CO partial pressures in the permeate to be insignificant in comparison with their partial pressures in the retentate. Again, Eq. (10) is used to calculate the membrane area, $H_2$ and CO concentrations in the retentate, and $H_2$ recovery for a $CO_2$ concentration of 1.2% in the retentate and a $CO_2/CO$ selectivity of 100. The membrane area is 17 ft², the retentate (product gas) has 97.1% $H_2$, 1.2% $CO_2$, and 1.7% CO at a total pressure of 10 atm, and the $H_2$ recovery is 83% of the $H_2$ available in the reformed gas. Again, the retentate is then treated in a methanator to convert $CO_2$ and CO to $CH_4$, giving a desirable fuel without containing $CO_2$ and CO for the fuel cell.

Example 5

$H_2$-Selective Membrane Process for Purification of a Reformed Gas without Containing $N_2$ at 10 atm (for Comparison)

For comparison, the membrane area and $H_2$, $CO_2$ and CO concentrations in the permeate, i.e., the product gas, for a $H_2$-selective membrane process with 80% $H_2$ recovery from the same reformed gas described in Example 4 (without containing $N_2$) are calculated in the same way as in Example 4 via Eq. (10) for the 10 KW fuel cell. The membrane process employs the state-of-the-art $H_2$-selective membrane (polyimide) described in Example 3 with a $H_2$ permeance of 100 GPU, a $H_2/CO_2$ selectivity of 10, and a $H_2/CO$ selec-

TABLE 1

Comparison of the $CO_2$-Selective Membrane Process with a $H_2$-Selective Membrane Process for Purification of a Reformed Gas Containing $N_2$*

| Process | Product Gas Composition (mole %) | | | | Total Product Gas Pressure (atm) | $H_2$ Recovery (%) | Membrane Area (ft²) |
|---|---|---|---|---|---|---|---|
| | $H_2$ | $CO_2$ | CO | $N_2$ | | | |
| $CO_2$-Selective Membrane Process, This Invention (Example 1) | 49.0 | 0.5 | 1.2 | 49.3 | 10 | 97.2 | 27 |
| $H_2$-Selective Membrane Process (Example 3) | 88.3 | 10.1 | 0.06 | 1.5 | 1 | 80 | 126 |

*The reformed gas contains 40% $H_2$, 19% $CO_2$, 1% CO, and 40% $N_2$ at total pressure of 10 atm.

tivity of 100, and this process yields the product gas (permeate) at 1 atm (without the use of a sweep gas). The membrane area is 45 ft$^2$, and the product gas (permeate) contains 92.7% H$_2$, 7.3% CO$_2$, and 0.04% CO. Table 2 shows the comparison of the CO$_2$-selective membrane process of the present invention (Example 4) with the H$_2$-selective membrane process (Example 5). As shown in this table, the membrane process of this invention gives higher H$_2$ concentration (97.1% vs. 92.7%), i.e., lower combined concentration of carbon oxides (1.2% CO$_2$ and 1.7% CO vs. 7.3% CO$_2$ and 0.04% CO), much higher product gas pressure (10 atm vs. 1 atm), greater H$_2$ recovery (83% vs. 80%), and less membrane area required (17 ft$^2$ vs. 45 ft$^2$) than the H$_2$-selective membrane process. In addition, the product gas of the former process with a lower combined concentration of carbon oxides is suitable for methanation to yield a desirable fuel cell fuel without carbon oxides, whereas the product gas of the latter process has too much CO$_2$ to be practically suitable for methanation. Thus, the process of this invention is again more effective and advantageous than the H$_2$-selective membrane process.

CO$_2$, the membrane was placed in a permeation cell comprising the first compartment for contacting a feed stream against the upstream side of the membrane and the second compartment for withdrawing the permeate from the downstream side of the membrane. The active membrane area in the cell was 63.62 cm$^2$. A feed gas comprising 75% H$_2$ and 25% CO$_2$ under a total pressure of about 3 atm at ambient temperature (23° C.) was contacted against the membrane at a flow rate of 120 cm$^3$/min. The permeate was swept by nitrogen under a pressure of about 1 atm and a total flow rate of 50.9 cm$^3$/min for the permeate/nitrogen stream. Both the feed and the sweep streams were humidified by bubbling through deionized water prior to contacting the membrane.

For the membrane of Example 6 comprising 50 wt % tetramethylammonium fluoride salt and 50 wt % polyvinylalcohol, the CO$_2$/H$_2$ selectivity result obtained was 19, and the C$_2$ permeability was 348 Barrers.

As shown in Example 7, the membrane of this invention may be employed for removal of CO$_2$ from a CO$_2$-containing gas, e.g., a reformed gas. The use of the membrane composition in the CO$_2$-selective membrane process

TABLE 2

Comparison of the CO$_2$-Selective Membrane Process with a H$_2$-Selective Membrane Process for Purification of a Reformed Gas without Containing N$_2$*

| Process | Product Gas Composition (mole %) | | | Total Product Gas Pressure (atm) | H$_2$ Recovery (%) | Membrane Area (ft$^2$) |
| --- | --- | --- | --- | --- | --- | --- |
| | H$_2$ | CO$_2$ | CO | | | |
| CO$_2$-Selective Membrane Process, This Invention (Example 1) | 97.1 | 1.2 | 1.7 | 10 | 83 | 17 |
| H$_2$-Selective Membrane Process (Example 3) | 92.7 | 7.3 | 0.04 | 1 | 80 | 45 |

*The reformed gas contains 74.9% H$_2$, 24% CO$_2$, 1.1% CO, at total pressure of 10 atm.

Example 6

Synthesis of 50 wt % Tetramethylammonium Fluoride Salt and 50 wt % Polyvinylalcohol Membrane To 18.65 g of water was added 3.0 g of polyvinylalcohol (PVA) with stirring and heating at about 75° C. until a clear solution of the polymer was obtained. Separately, 5.32 g of a tetramethylammonium fluoride salt with 4 H$_2$O ((CH$_3$)$_4$NF.4 H$_2$O), which contained 3.0 g of tetramethylammonium fluoride salt, was dissolved in 5 g of water. This solution was added to the PVA solution with stirring for about 15 minutes to obtain a clear, homogeneous solution. The resulting solution was then centrifuged while cooling for about 30 minutes. Following centrifugation, a membrane was knife-cast with a gap setting of 8 mils onto a support of microporous polytetrafluoroethylene. Water was allowed to evaporate from the membrane overnight in a nitrogen box at ambient conditions. The membrane was then heated in an oven at 90° C. for 5 hours. The resulting membrane comprised about 60 wt % tetramethylammonium fluoride salt and 50 wt % polyvinylaclohol on the microporous polytetrafluoroethylene support, and had a thickness of 49 microns (exclusive of the support).

Example 7

Permeation Measurement of Membrane of Example 6

In the permeation measurement to evaluate the separation factor (selectivity) of CO$_2$ vs. H$_2$ and the permeability of of the present invention for the purification of a reformed gas for a fuel cell vehicle has been described in Example 4.

What is claimed is:

1. A system for converting a fuel feedstream to a hydrogen rich and CO$_2$ and CO deficient feedstream comprising a reformer, a water gas shifter, comprising CO$_2$-selective membrane, and a methanator, wherein said membrane is a composition comprising a hydrophilic polymer and at least one ammonium halide salt, the ammonium halide salt being present in an amount ranging from about 10 to about 80 wt % based on the total weight of the composition, wherein the ammonium halide salt is selected from ammonium halide salts having the formulae and mixtures thereof:

(R)$_4$N$^+$X$^-$ wherein R is hydrogen or an alkyl group having from 1 to 4 carbon atoms and X is a halide, the halide being selected from the group consisting of fluoride, chloride, bromide, iodide, and mixtures thereof.

2. The system of claim 1 further comprising a fuel cell.

3. The system of claim 2 wherein said system is on-board a vehicle that is driven by said fuel cell.

4. The system of claim 1 wherein said hydrophilic polymer is selected from the group consisting of polyvinylalcohol, polyvinylpyrrolidone, polyethyleneoxide, polypropyleneoxide, polyacrylamide, polyvinylacetate, blends thereof and copoloymers thereof.

5. The system of claim 1 wherein said polymer is polyvinylalcohol.

6. The system of claim 1 wherein said composition includes from about 1 to about 20 wt % of a cross-linking agent based on the total weight of the composition.

7. The system of claim 1 wherein said cross-linking agent is selected from the group consisting of formaldehyde, divinyl sulfone, toluene disocyanate, glyoxal, glutaraldehyde, trimethylol melamine, terephthaladehyde, epichlorohydrin, vinyl acrylate, and maleic anhydride.

8. The system of claim 1 wherein the ammonium halide salt is tetramethylammonium fluoride salt.

9. A system for converting a fuel feedstream to a hydrogen rich and $CO_2$ and CO deficient feedstream comprising a reformer, a water gas shifter, $CO_2$ separator comprising $CO_2$-selective membrane, and a methanator, wherein said membrane is a composition comprising a hydrophilic polymer and at least one ammonium halide salt, the ammonium halide salt being present in an amount ranging from about 10 to about 80 wt % based on the total weight of the composition, wherein the ammonium halide salt is selected from ammonium halide salts having the formulae $(R)_4N^+X^-$ an mixtures thereof, wherein R is hydrogen or an alkyl group having from 1 to 4 carbon atoms and X is a halide, the halide being selected from the group consisting of fluoride, chloride bromide, iodide, and mixtures thereof.

10. The system of claim 9 further comprising a fuel cell.

11. The system of claim 10 wherein said system is on-board a vehicle that is driven by said fuel cell.

12. A system for converting a fuel feedstream to a hydrogen rich and $CO_2$ and CO deficient feedstream comprising a reformer comprising $CO_2$-selective membrane, and a methanator, wherein said membrane is a composition comprising a hydrophilic polymer and at least one ammonium halide salt, the ammonium halide salt being present in an amount ranging from about 10 to 80 wt % based on the total weight of the composition, wherein the ammonium halide salt is selected from ammonium halide salts having the formulae $(R)_4N^+X^-$ an mixtures thereof, wherein R is hydrogen or an alkyl group having from 1 to 4 carbon atoms and X is a halide, the halide being selected from the group consisting of fluoride, chloride, bromide, iodide, and mixtures thereof.

13. The system of claim 12 further comprising a fuel cell.

14. The system of claim 13 wherein said system is on-board a vehicle that is driven by said fuel cell.

15. A system for converting a carbon fuel feedstream to a hydrogen rich and $CO_2$ and CO deficient feedstream comprising of a reformer, $CO_2$ separator comprising $CO_2$-selective membrane, and a methanator, wherein said membrane is a composition comprising a hydrophilic polymer and at least one ammonium halide salt, the ammonium halide salt being present in an amount ranging from about 10 to about 80 wt % based on the total weight of the composition, wherein the ammonium halide salt is selected from ammonium halide salts having the formulae $(R)_4N^+X^-$ an mixtures thereof, wherein R is hydrogen or an alkyl group having from 1 to 4 carbon atoms and X is a halide, the being selected from the group consisting of fluoride, chloride, bromide, iodide, and mixtures thereof.

16. The system of claim 15 further comprising a fuel cell.

17. The system of claim 16 wherein said system is on-board a vehicle that is driven by said fuel cell.

* * * * *